US007287540B2

(12) United States Patent
Hammonds et al.

(10) Patent No.: US 7,287,540 B2
(45) Date of Patent: Oct. 30, 2007

(54) METHOD FOR INTRODUCING DRAG REDUCERS INTO HYDROCARBON TRANSPORTATION SYSTEMS

(75) Inventors: Paul Hammonds, Katy, TX (US); Vladimir Jovancicevic, Houston, TX (US); C. Mitch Means, Needville, TX (US); David Green, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 278 days.

(21) Appl. No.: 10/789,515

(22) Filed: Feb. 27, 2004

(65) Prior Publication Data

US 2004/0216780 A1 Nov. 4, 2004

Related U.S. Application Data

(60) Provisional application No. 60/454,759, filed on Mar. 14, 2003.

(51) Int. Cl.
*F17D 1/16* (2006.01)
*G05D 11/13* (2006.01)

(52) U.S. Cl. ......................... 137/13; 137/3; 137/87.03; 137/101.21; 137/896

(58) Field of Classification Search .................... 137/3, 137/13, 87.03, 98, 896, 897, 101.21; 507/267, 507/270

See application file for complete search history.

(56) References Cited

U.S. PATENT DOCUMENTS

| | | | | |
|---|---|---|---|---|
| 3,502,103 | A * | 3/1970 | Verschuur | 137/565.33 |
| 3,601,079 | A * | 8/1971 | Giles et al. | 114/67 R |
| 3,857,402 | A * | 12/1974 | Schuh | 137/13 |
| 3,900,043 | A * | 8/1975 | Bowen et al. | 137/101.21 |
| 4,343,323 | A * | 8/1982 | Kessick et al. | 137/13 |
| 4,510,958 | A * | 4/1985 | Coursen | 137/13 |
| 4,722,363 | A * | 2/1988 | Allyn | 137/601.18 |
| 5,027,843 | A | 7/1991 | Grabois et al. | |
| 5,165,441 | A * | 11/1992 | Mitchell | 137/13 |
| 5,361,797 | A * | 11/1994 | Crow et al. | 137/101.19 |
| 5,539,044 | A | 7/1996 | Dindi et al. | |
| 6,849,581 | B1 * | 2/2005 | Thompson et al. | 507/118 |
| 2002/0002994 | A1 * | 1/2002 | Babenko | 137/13 |
| 2002/0008049 | A1 * | 1/2002 | Inomata et al. | 208/57 |

* cited by examiner

*Primary Examiner*—Ramesh Krishnamurthy
(74) *Attorney, Agent, or Firm*—Madan Mossman & Sriram PC

(57) ABSTRACT

Disclosed is a method of reducing drag in a fluid stream. The method includes admixing the components of a drag reducer to form an incipient drag reducer and injecting the incipient drag reducer into the fluid stream wherein the drag reducer components are admixed at the site of the fluid stream.

16 Claims, 2 Drawing Sheets

METHOD FOR INTRODUCING DRAG REDUCERS INTO HYDROCARBON TRANSPORTATION SYSTEMS

CROSS REFERENCE TO RELATED APPLICATION

This application claims priority from U.S. Provisional Patent Application No. 60/454,759, filed Mar. 14, 2003.

BACKGROUND OF THE INVENTION

1. Field of the Invention

The present invention relates to a method for introducing drag reducers into fluid transportation systems. The present invention particularly relates to a method for introducing drag reducers into pipelines carrying hydrocarbons.

2. Background of the Art

Hydrocarbon fluids as produced from oil-bearing subterranean formations are typically composed of oil and water. Such fluids may also contain natural gas, and will often contain oil and water insoluble compounds such as clay, silica, waxes, and asphaltenes, which exist as colloidal suspensions. The hydrocarbon fluids, once produced, are transported from the wellsite to refineries by one or more of tanker trucks, pipelines, railcars, and the like.

When transported by pipeline, the force required to move the hydrocarbons through the pipeline must be overcome using pumps. The force which must be overcome to push the hydrocarbon through the pipe, most often described as drag, is desirably reduced as much as possible. Reasons for reducing drag include energy costs associated with running the pumps to overcome the drag and the capital costs of buying and maintaining these pumps. Wear and tear on the pipeline system itself can also be mitigated by reducing drag. Reduction in drag allows for enhanced hydrocarbon production from constrained oil wells.

There have been many types of materials used to reduce drag. For example, U.S. Pat. No. 5,539,044 to Dindi, et al., teaches introducing into the stream a stable, non-agglomerating suspension comprising: (a) water, (b) a substantially insoluble and extremely finely-divided, non-crystalline, ultra-high molecular weight, hydrocarbon-soluble, undegraded polyalkene having 2 to about 30 carbon atoms per alkene precursor, highly dispersed in water, and (c) a small but effective amount of a surfactant having a hydrophilic-lipophilic balance of at least about 9.

In U.S. Pat. No. 5,027,843 to Grabois, et al., it is taught to reduce drag by injecting a water emulsion into the pipeline. The emulsion is prepared using a drag-reducing polymer such as a polyacrylamide polymer. The use of polyalphaolefins or copolymers thereof to reduce the drag of a hydrocarbon flowing through a conduit, and hence the energy requirements for such fluid hydrocarbon transportation, is also well known.

The use of these materials, and particularly the polymer materials as drag reducers can be troublesome. Polymers in particular are particularly sensitive to shear forces that can degrade the polymer's ability to act as a drag reducer. It would be desirable in the art of transporting hydrocarbons to introduce drag reducers into a hydrocarbon without materially reducing the effectiveness of the drag reducer.

SUMMARY OF THE INVENTION

In one aspect, the present invention is a method for introducing a drag reducer into a fluid stream comprising admixing the components of a drag reducer to form an incipient drag reducer and injecting the incipient drag reducer into the fluid wherein the drag reducer components are admixed at the site of the fluid stream.

In another aspect, the present invention is an apparatus for introducing a drag reducer into a fluid stream comprising at least two sources of drag reducing components, at least two metering devices for combining a predetermined ratio of the drag reducing components, at least one mixing device, and at least one exit from the at least one mixing device.

BRIEF DESCRIPTION OF THE DRAWINGS

For a detailed understanding and better appreciation of the present invention, reference should be made to the following detailed description of the invention and the preferred embodiments, taken in conjunction with the accompanying drawing, wherein.

Figure 1:
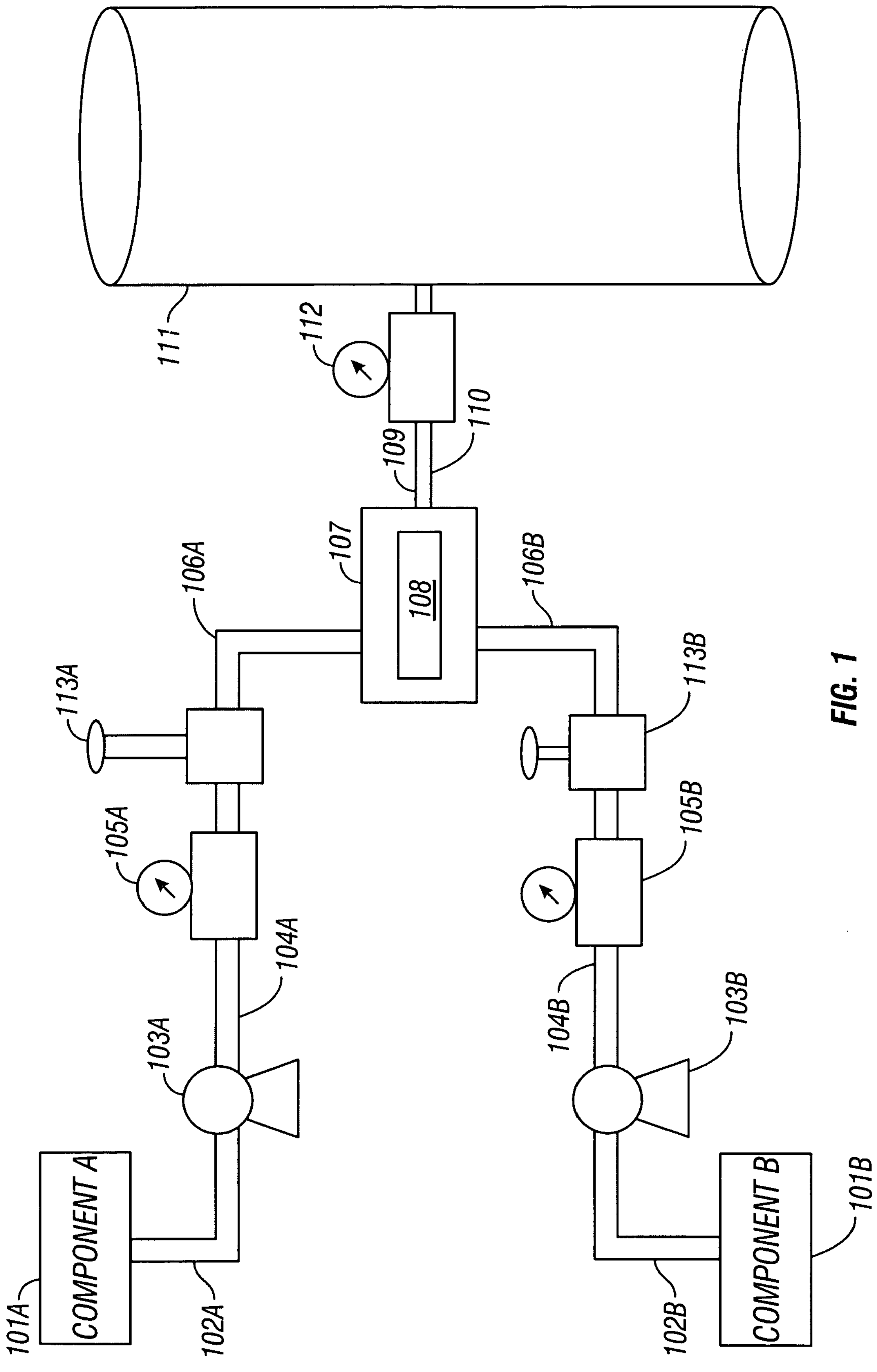
FIG. 1 is a schematic overview showing an apparatus of the present invention.

It will be appreciated that the figure is not necessarily to scale and the proportions of certain features are exaggerated to show detail.

DESCRIPTION OF THE PREFERRED EMBODIMENTS

In one embodiment, the present invention is a method for introducing a drag reducer into a fluid stream. For the purposes of the present invention, a drag reducer is any compound or mixture of compounds that can function to reduce drag in a flowing fluid. The drag reducers useful with the present invention can be prepared by admixing at least two components, with or without the addition of heat. For example, a drag reducer useful with the present method can be prepared by mixing two components and then passing those components through a mixer in the presence of heat. An exemplary drag reducer useful with the present invention is the product of admixing at least one aluminum monocarboxylate in a hydrocarbon solvent, made from a fatty acid having from 6 to 54 carbon atoms with at least one carboxylic acid having from 6 to 54 carbon atoms. A drag reducer prepared with an aluminum polycarboxylate can also be used with the method of the present invention.

Another drag reducer useful with the present invention would be a polymer drag reducer wherein a first component of the polymer monomer could be admixed with a second component of a polymerization initiator. Still another drag reducer useful with the present invention is a drag reducer prepare by admixing a first component, the first component being a first monomer, and a second component, the second component including a second monomer and a polymerization initiator. Any such polymer could be used with the method of the present invention.

The present invention is a method for introducing a drag reducer into a fluid stream comprising admixing the components of a drag reducer to form an incipient drag reducer. For the purposes of the present invention, the term incipient drag reducer means the admixture of the components of a drag reducer starting at the point in time that the components are admixed and continuing until the admixture is injected into a fluid stream. For example, in the practice of the present invention, a drag reducer formulation is divided into two components, an A and a B component. At the point the two components are admixed, they become an incipient drag reducer. For the purposes of the present invention, they continue to be an incipient drag reducer until they are injected into a pipeline of moving fluid.

Desirably, the drag reducers used with the present invention can have an induction period such that, after the incipient drag reducer is prepared, any shear sensitive properties do not form until the incipient drag reducer has passed beyond the bounds of high shear forces in the device used to prepare and inject the drag reducer into a fluid stream. For example, in FIG. 1, Component A from a first vessel for same (101A) is first pumped through a line (102A) by pump (103A). Typically, the pump will be a source of high shear forces. In a preferred embodiment of the present invention, the components of the drag reducer are selected such that neither Component A nor Component B is shear sensitive.

Component A next passes through a line (104A) and through a flow meter (l05A). Component A (101A) then passes through another line (106A) and into another point of high shear, the mixer (107). Shear can also be introduced in the mixing section (108) of the mixer (107), which can be a static mixer, powered mixer, or any other device capable of admixing Component A and Component B. In a preferred embodiment, the mixing section (108) of the mixer (107) is an impeller that also provides additional force to facilitate injection of incipient drag reducer from an exit from the mixer (109) and through a line (110) into a pipeline (111) of moving fluid.

Similarly, in the practice of an embodiment of the method of the present invention, the second component, Component B, is also pumped from a source thereof (101B) by a pump (103B) and through a flow meter (105B). Component B then enters the mixer and is admixed with Component A to form the incipient drag reducer. In a preferred embodiment of the method of the present invention, the fully formed drag reducer has a high viscosity, but the induction period between the admixing of the drag reducer components and the development of the high viscosity property of the drag reducer is longer than the time that the incipient drag reducer is resident within the mixer (107). In an even more preferred embodiment of the method of the present invention, the high viscosity property does not develop until the incipient drag reducer enters the pipeline (111).

In a particularly preferred embodiment of the present invention, the drag reducer components can be admixed in varying flow rates to change the drag reducing properties of the incipient drag reducer in the fluid stream. The pumps of the present invention (103 A&B) and flow meters upstream of the mixer (105A&B) can be used to admix components A and B in varying ratios and at varying flow rates. This can be done using any technique known to those of ordinary skill in the art, for example by either running the pumps at different rates or also using the control valves (113A&B). An additional flow meter downstream from the mixer (112) can used as a check upon the performance of the system and to make sure that the requirements for total delivery of the drag reducer are being met. Thus, the method of the present invention can be practiced wherein the drag reducer properties and the injection rate can be adjusted according to the properties and flow rate of the fluid stream.

Figure 2:
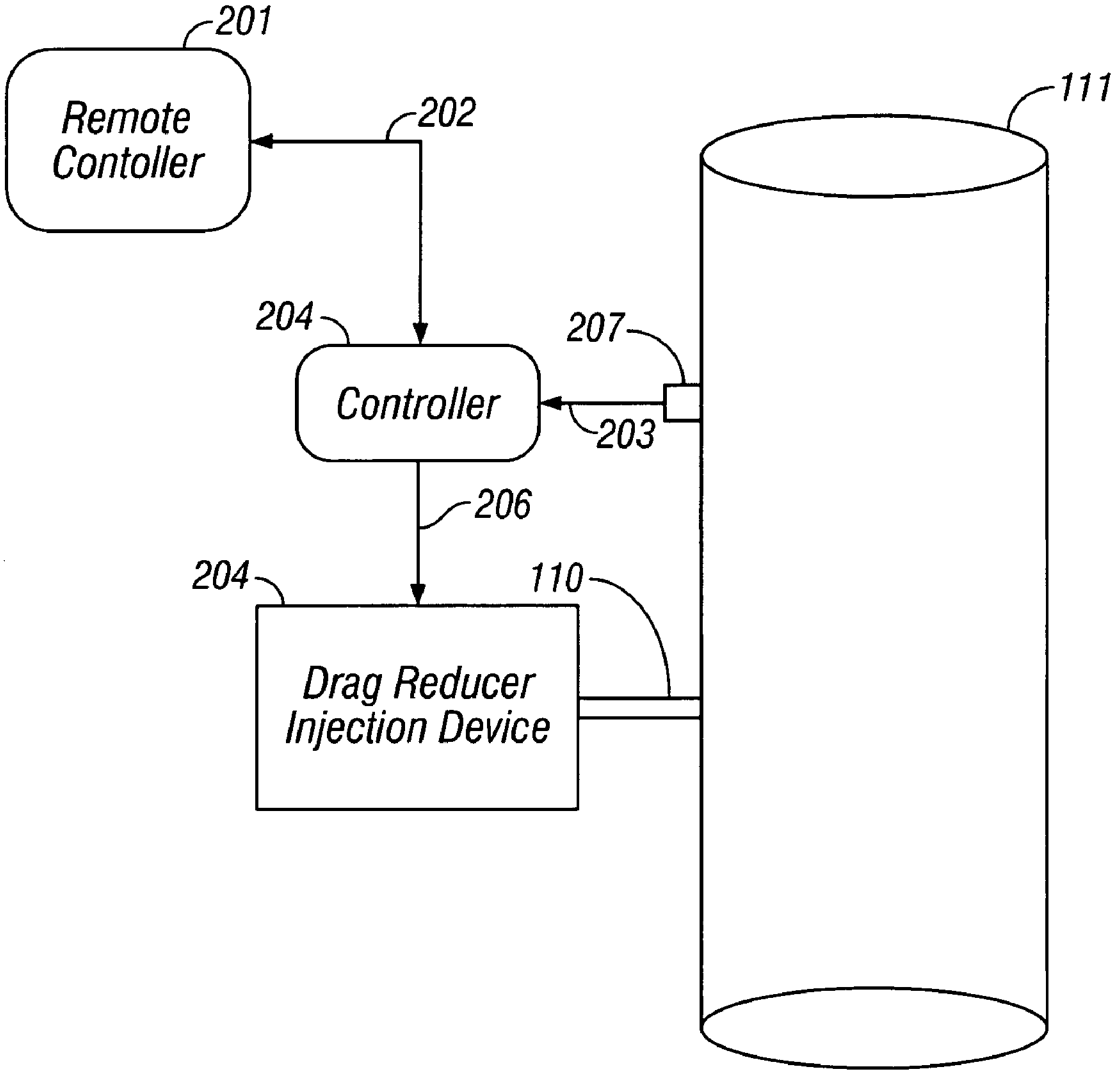
FIG. 2 is a schematic overview of alternative embodiment of the present invention.

An alternative embodiment of the present invention includes controlling the rate of flow as well as the ratio of the two drag reducer components based on the properties of the fluid stream into which the incipient drag reducer is being injected. In FIG. 2, the drag reducer injection device (205), as illustrated in FIG. 1, is shown being controlled using a remote controller (201). The remote controller (201) has two-way communications with the local controller (204) via a communications line (202). The local controller can send commands to the drag reducer injection device over a communications line (206) to, for example, change flow rates and injection ratios. The local controller (204) can determiner properties of the fluid stream within the pipeline (111) using a sensor (207) and a communications line (203), such properties including but not limited to flow rates and flow drag parameters.

The remote controller (201) can be used to do some or all of the calculations of flow rate and component ratios. The remote controller (201) can also be used to receive information regarding the fluid flow stream and communicate same to the local controller (204) or merely use that information in calculating the flow rates and injection ratios for transmission to the local controller (204).

In the embodiment of the method of the present invention illustrated in FIG. 2, communications over the various communication lines (202, 203, and 206) can be performed using any wired or wireless method known to those of ordinary skill in the art of effecting communications between electronic devices. For example, a local area network could be used for one or all of these communications. Either or both of the remote controller (201) and the local controller (204) can be computers or other control devices. In one preferred embodiment, the functions of the remote controller (201) and local controller (204) are performed using a SENTRY SYSTEM™ available from BAKER PETROLITE®. The local controller (204) can be programmed by the remote controller (201), but, in the alternative, it can also be programmed using a local input device such as a terminal or set points (not shown). In the method of the present invention, one or both of the controllers can sense fault conditions and send a signal for maintenance service.

The pumps and flow meters useful with the present invention can be any known to be useful for such applications to those of ordinary skill in the art. For example, for low flow high pressure applications, a gear, diaphragm, or piston pump could be used, while for higher volume applications, a centrifugal pump can be used. Similarly, any suitable flow meter can be used, but preferably the flow meter is a mass flow meter or a positive displacement flow meter. Most preferably the flow meter is a positive displacement flow meter such as a turbine meter.

In the practice of the method of the present invention, an incipient drag reducer is injected into a fluid stream. While the method of the present invention can be used with any fluid stream wherein drag is a problem, in a preferred embodiment, the fluid stream is a hydrocarbon stream. Exemplary hydrocarbon streams include: a hydrocarbon fluid as directly produced from an oil well, such a fluid after having its solids and aqueous liquid content reduced, and also a stream or partially or fully refined hydrocarbons such as gasoline or fuel oil. The second example above would typically be observed wherein a fluid recovered from an oil producing formation is passed through a dehydrator and/or a desalter. Yet another example of a hydrocarbon stream is a stream of gaseous hydrocarbons wherein less than about 10 percent by weight of the hydrocarbons are in a liquid form. Hydrocarbon streams such as this latter one are often observed in connection with gas wells.

The method of the present invention can be practiced with a stream of fluid moving in any type of vessel. Preferably though, the method of the present invention is practiced with a pipeline or, in an alternative embodiment, a pipe header.

The pipeline can be above ground, subterranean or subsea. The pipe header can be, for example, in a refinery or chemical production facility.

In the practice of the present invention, the drag reducer components are admixed at the site of the fluid stream. It is well known to prepare drag reducers and transport them to locations to treat fluid and the present invention does not include such an embodiment. Rather, the present invention is limited to the practice of admixing at least two components that include all of the materials of a drag reducer formulation. It is these at least two components that are transported to site of a fluid stream and first admixed and then injected into the fluid stream. There can be several advantages to the method of the present invention over the prior art including avoiding degradation of drag reducer properties due to high shear, transportation costs for solvents, and longer shelf lives.

Other advantages of the present invention include reduced production costs and special applications. The former advantage is realized from reduced capital expenditures and labor costs at production facilities due to at least part of the drag reducer production being moved from the manufacturing plant to the use site. The latter advantage is shown by the ability to use the drag reducers of the present invention in applications where they were not even feasible before, such as use in long undersea umbilicals wherein the viscosity of the prior art drag reducers would not have allowed such use.

In an alternative embodiment of the present invention, the incipient drag reducers are prepared using three components. The contents of the third components can include additives, solvents, and even an additional material that will react with one or both of the first two components to form the incipient drag reducer. This can be a particularly desirable embodiment wherein the drag reducer would otherwise include water. Water, which is often readily available on site, can be expensive to transport and thus be a cost factor in regard to a prior art preformed drag reducers relative to the on-site prepared drag reducers of the present invention.

In the practice of the present invention, the drag reducer components can be admixed at ambient temperatures or they can be admixed at sub- or supra-ambient temperatures. Desirably, some drag reducers can be prepared at lower or higher temperatures than the ambient temperatures of the fluid stream site. In such circumstances, the admixing and injection apparatus can be heated at any location known to be useful to those of ordinary skill in preparing drag reducers on site. For example, a heated apparatus can be prepared by using electrical or steam heat tracing along the pipes and vessels making up the apparatus. Chill water, for example, could be used to prepare drag reducers at a sub-ambient temperatures.

It is further noted that while a part of the foregoing disclosure is directed to some preferred embodiments of the invention or embodiments depicted in the accompanying drawings, various modifications will be apparent to and appreciated by those skilled in the art. It is intended that all such variations be within the scope of the claims.

What is claimed is:

1. A method for introducing a drag reducer into a fluid stream comprising admixing at least a non-shear-sensitive first drag reducer component and a non-shear-sensitive second drag reducer component to form a non-shear-sensitive incipient drag reducer, and injecting the non-shear-sensitive incipient drag reducer into a fluid stream under conditions such that the incipient drag reducer undergoes an induction period during which it remains non-shear sensitive and thereafter forms a shear-sensitive drag reducer in the fluid stream.

2. The method of claim 1 wherein the fluid stream is in a pipeline.

3. The method of claim 2 wherein the fluid stream is a hydrocarbon stream.

4. The method of claim 3 wherein the hydrocarbon stream is the product of passing a hydrocarbon stream from a geological formation through a desalter.

5. The method of claim 3 wherein the hydrocarbon stream is the product of passing a hydrocarbon stream from a geological formation through a dehydrator.

6. The method of claim 3 wherein the hydrocarbon stream is the product of passing a hydrocarbon stream from a geological formation through a desalter and a dehydrator.

7. The method of claim 1 wherein the components of the drag reducer have been first combined to form a smaller number of components, and then the smaller number of components are admixed to form the incipient drag reducer.

8. The method of claim 7 wherein the smaller number of components are admixed in varying ratios to produce an incipient drag reducer having varying properties.

9. The method of claim 8 wherein the incipient drag reducer is injected at varying rates.

10. The method of claim 8 wherein the ratio of the drag reducer components is varied according to the properties of the fluid stream.

11. The method of claim 9 wherein the rate of injection of the incipient drag reducer is varied according to the rate of flow of the fluid stream.

12. The method of claim 7 wherein the incipient drag reducer is prepared by admixing only the first and second drag reducer components.

13. The method of claim 12 wherein the first drag reducer component comprises an aluminum monocarboxylate in a hydrocarbon solvent, wherein the aluminum monocarboxylate is made from a fatty acid having from 6 to 54 carbon atoms, and the second drag reducer component comprises a carboxylic acid having from 6 to 54 carbon atoms.

14. The method of claim 12 wherein the first drag reducer component comprises an aluminum dicarboxylate in a hydrocarbon solvent, wherein the aluminum dicarboxylate is made from a fatty acid having from 6 to 54 carbon atoms, and the second drag reducer component comprises a carboxylic acid having from 6 to 54 carbon atoms.

15. The method of claim 1 wherein the drag reducer components are admixed at sub-ambient temperatures.

16. The method of claim 1 wherein the drag reducer components are admixed at supra-ambient temperatures.

* * * * *